May 23, 1950 S. D. BRADLEY 2,508,988
HEAT CONTROL
Filed Sept. 17, 1945

INVENTOR.
Stephen D. Bradley
BY
Gray and Smith
ATTORNEYS

Patented May 23, 1950

2,508,988

UNITED STATES PATENT OFFICE 2,508,988

HEAT CONTROL

Stephen Duncan Bradley, Grosse Pointe Farms, Mich., assignor to Detroit Macoid Corporation, Detroit, Mich., a corporation of Michigan Application September 17, 1945, Serial No. 616,824

8 Claims. (Cl. 257—3)

This invention relates to a heat control device intended for attachment to a plastic extrusion or molding machine. The device of the present invention may be used either as an attachment to an existing molding or extrusion machine, or it may be used as a permanent or integral part of a plastic extrusion or molding machine designed therefor.

In the extrusion or molding of plastic materials, an important consideration is the constancy with which the temperature of the plastic material is maintained. The degree to which the temperature in such operations must be maintained constant depends upon the type of plastic material to be extruded or molded. Experience has shown that in order to obtain an extruded shape or a molded shape of good quality, the viscosity of the plastic material must be maintained within close limits by maintaining a close control of the temperatures which obtain throughout the mass of the plastic material at the time it is to be extruded or molded. The heat must be controlled to provide a constant temperature whose value is proper for the desired viscosity of the materials without effecting a permanent thermally caused change therein. If a temperature in excess of a critical limit is produced in the plastic material, the result is either a discolored or deteriorated product or a product whose physical characteristics are inferior to those desired.

Maintenance of constant temperature in the plastic material within the required limits presents a difficult problem for the heating equipment must be so designed as to have available sufficient capacity to meet the maximum heating demands of the plastic material flowing through the extrusion or molding head. However, the characteristic intermittent flow the plastic material through the heating device requires that means must be provided to control the temperature overswing of the equipment when the flow of material is less than that required to utilize the full heat output of the equipment. Heretofore reliance has been placed upon the operator of the machine to control the temperatures and produce the desired product.

An object of the present invention is to provide a controlled heating device for a plastic fabricating machine in which electric strip heaters are utilized as the source of heat energy.

A further object of the present invention is to provide a controlled heating device for plastic fabricating machines in which thermostatically controlled electric strip heaters are utilized to obtain constancy of temperatures within controlled limits.

Another object of the present invention is to provide a means of mounting electric strip heaters on the heating device to assure a maximum heat transfer of the heat energy from the electric strip heaters to the body of the heating device.

A further object of the present invention is to provide a heating device provided with a means for rapidly removing heat from the source of the heat energy without transfer of the heat to the plastic material.

Another object of the present invention is to provide an efficient heating unit in which thermal insulation is provided to reduce the loss of the radiant energy of the heating device.

Another object of the present invention is to provide a controlled accelerated cooling of the heating device in which the control is provided by a temperature sensitive element placed immediately adjacent the cavity in which the plastic material is heated by the heating units.

A further object of the present invention is to provide a heating and heat control unit for plastic fabricating machines which may be attached to existing plastic fabricating equipment.

Other objects of this invention will appear in the following description and appended claims, reference being had to the accompanying drawings forming a part of this specification wherein like reference characters designate corresponding parts in the several views.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
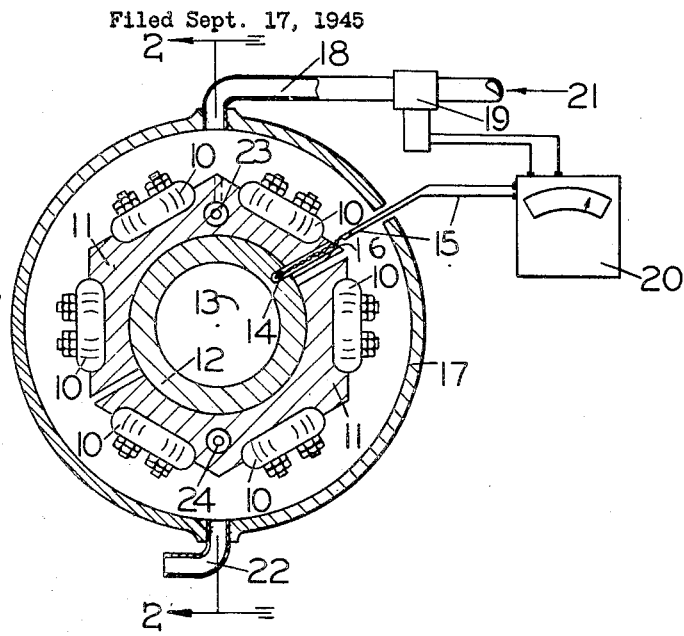
Fig. 1 is a partial cross-sectional view of a heating and heat control device embodying the present invention and showing diagrammatically the arrangement and location of the external temperature control equipment.
Figure 2:
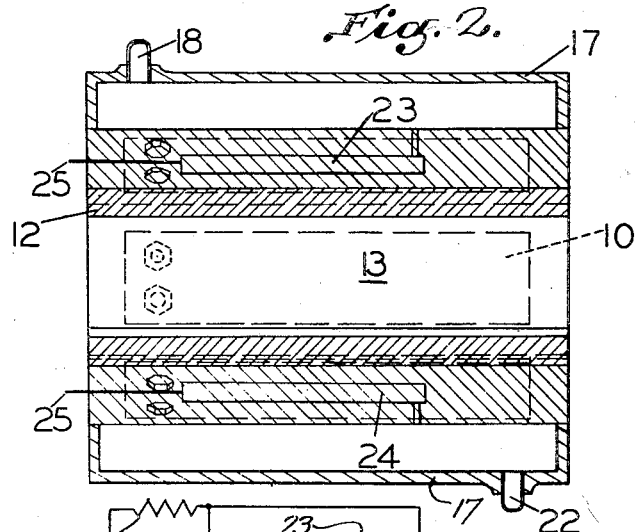
Fig. 2 is a longitudinal section taken substantially on the line 2—2 in the direction of the arrows, Fig. 1.

Referring to Fig. 1, a heating device of the present invention comprises a plurality of symmetrically disposed electric heating strips 10 partially embedded in a two-part supporting member 11, mounted on and surrounding the plastic conveyor tube 12, in heat exchanging relation thereto. The supporting member 11 is formed of a heat conducting metal or metal alloy, as for example aluminum, or copper, or their alloys. The plastic to be heated flows through the space 13 inside the tube 12 and flows to the nozzle (not shown) of a conventional extrusion or injection molding machine. The element support 11 is provided with small cavities for the accommodation of thermostat elements 23 and 24 which are electrically connected through the leads 25 to control the flow of current to the heating units 10 to regulate the temperature of the element support 11. Embedded in the plastic conveyor tube 12 is a thermocouple 14, whose leads 15 are made accessible for connection by a suitable hole 16 provided in the element support 11.

The heating elements 10 and the support 11 are surrounded by a tubular housing 17 whose internal and external surfaces are polished in order to enhance its ability to insulate against the escape of radiant energy from the heating element. High velocity air or other fluid coolant is introduced through a supply pipe 18 to the cavity surrounding the heating elements inside the tubular housing 17. The flow of coolant through the pipe 18 is controlled by the solenoid valve 19, which is opened or closed under the control of the temperature controller 20, whose sensitive element is the thermocouple 14. A fluid coolant, such as air under pressure, is supplied to the pipe 18 from a suitable source indicated by the arrow 21. The coolant is exhausted from the tubular housing 17 through the coolant outlet 22.

The operation of the device is as follows:

With thermo-plastic material flowing through the space 13 in the tube 12, and at a lower temperature than desired for the fabrication of the plastic, the thermostats in the openings 23 and 24 operate to energize the electric strip heating elements 10. The heat thus generated is transferred to the element support 11 which by conduction heats the tube 12. This heat in turn in transferred to the plastic material inside the tube 12. As soon as the element support 11 has reached a temperature at which the plastic material is in the desired condition, the thermostats in the openings 23 and 24 de-energize the electric heating elements 10. However, sufficient residual heat may still be left in the heating elements 10 and the support 11 so that the temperature of the plastic conveyor tube 12 will continue to rise. If the temperature in the plastic conveyor tube 12 rises to a predetermined level, the thermocouple 14 operates the temperature controller 20, which in turn opens the solenoid valve 19 to permit the flow of fluid coolant such as air under high pressure through the cavity within the tubular housing 17. This flow of coolant through the chamber accelerates the cooling of the heating element 10, and the element support 11, and quickly reduces the temperatures inside the radiation tube 17 and so cools plastic conveyor tube 12. The fluid coolant is exhausted through the outlet 22.

As soon as the temperature of the plastic conveyor tube 12 has been reduced below the danger point, the thermocouple 14 actuates the temperature controller 20 to close the solenoid valve 19 and shut off the flow of coolant through the intake pipe 18.

Various suitable electrical circuits may be suggested by a skilled technician for properly opening or closing the heating circuits in accordance with the temperature of the thermostats 23 and 24.

Figure 3:
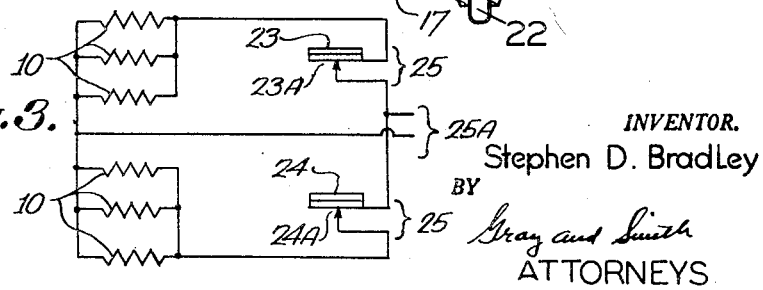
Fig. 3 is a schematic view of a wiring diagram suitable for use with the present invention.

A particular circuit is shown schematically by way of example in Fig. 3 wherein the thermostat switches 23A and 24A are normally closed at room temperatures, and each opens when the respective portion of the two-part support 11 for the corresponding thermostat 23 or 24 is heated to a desired preselected temperature. The three heaters 10 in the one portion of the two-part support 11 are operated separately from the three heaters 10 in the other portion of the support 11, the two sets of heaters being electrically connected in parallel with the source of electrical power 25A. Thus a refinement of control is available where required, inasmuch as the thermostats 23 and 24 may be adjusted to open their respective thermostat switches 23A and 24A at different temperatures.

Although the thermostats 23 and 24 are shown as bimetallic thermostats for the purpose of the present illustration, it is apparent that other types of thermostat switches may be equally feasible for use with the present invention.

It is to be understood that any desired type of fluid coolant may be employed. However, compressed air has been found to be the most desirable in many respects. It is desirable to unite the strip heating elements 10 to the support 11 in such a manner as to secure a maximum heat transfer by conduction from the elements 10 to the support 11. In order to assure an intimate surface contact between the elements 10 and the cavities in the support 11, the cavities are preferably lined with a heat fusible powder, as for example zirconium oxide, which provides an intimate thermal contact between the surfaces of the strip heating elements 10 and the surfaces of the cavities in the support 11.

The heating elements 10 may be connected in series, parallel or in series parallel with any suitable source of electric energy and are preferably each connected with a suitable externally placed indicator to indicate the operability of each unit.

From the foregoing it will be seen that I have provided a heating device and a heat control which is capable of heating a plastic material while controlling the heat condition thereof within close predetermined limits. The device of the present invention not only controls the heat generated by the heating element but also provides a means for the rapid dissipation of any excess heat generated in the device and in this manner prevents overheating of the plastic materials.

I claim:

1. A heating device and heat control for a plastic fabricating machine, and including a thermally conductive tube for heating the plastic material, an electrically actuated heating unit surrounding said tube and maintained in heat exchanging relation thereon, and including a plurality of spaced symmetrically disposed separate strip type electric heating elements mounted on a support secured to said heating tube and electrically connected with a source of electric energy, and means including a thermostat embedded in said support for controlling the supply of electric current to said heating elements, a chamber surrounding said heating unit, a supply inlet communicating with a source of fluid coolant and opening into said chamber and a discharge outlet for the fluid coolant passing through said chamber.

2. A heating device and heat control for a plastic fabricating machine, and including a thermally conductive tube for heating the plastic material, an electrically actuated heating unit surrounding said tube and maintained in heat exchanging relation thereon, and including a plurality of spaced symmetrically disposed separate strip type electric heating elements mounted on a support secured to said heating tube and electrically connected with a source of electric energy, and means including a thermostat embedded in said support for controlling the supply of electric current to said heating elements, a chamber surrounding said heating unit, a supply inlet communicating with a source of fluid coolant and opening into said chamber and a discharge outlet for the fluid coolant passing through said chamber, an electrically actuated valve in said supply inlet and a control circuit for actuating said valve and including a heat responsive element mounted directly in contact with said heating tube.

3. A heating control device for a plastic fabricating machine including a thermally conductive heating tube for the plastic material to be fabricated, means connected with said tube for heating thereof means for cooling said tube and including a chamber surrounding said tube and said heating means, a supply line having an inlet opening into said chamber and connected with a source of fluid coolant and a discharge outlet spaced from said supply inlet for discharging the fluid coolant after circulation through said chamber, means for regulating the flow of fluid coolant through said chamber in accordance with the temperature of said tube and including a valve in said supply line, and a thermal control element maintained in thermal contact with said tube and connected with means for controlling said valve.

4. A temperature control for maintaining a controlled temperature on thermo-plastic materials and including a heat conducting tube for holding the thermo-plastic material, a heater for heating said tube and the thermo-plastic material therein, a control for regulating the temperature of said heater, a cooler surrounding said tube and said heater and including a chamber and means responsive to the temperature of said thermoplastic material for regulating circulation of a fluid coolant through said chamber in heat exchange relation to said heater.

5. A temperature control for maintaining a controlled temperature on thermo-plastic materials and including a heat conducting tube for holding the thermo-plastic material therein, heating means connected with said tube for heating thereof, a control for said heating means, a cooler surrounding said tube and said heating means and including a chamber and means for circulating a fluid coolant through said chamber in heat exchange relation to said heating means, a regulator valve for regulating the flow of fluid through said chamber, and control means actuated by the temperature of said heat conducting tube for controlling said valve.

6. A heating device as claimed in claim 2 and further characterized in that said support is formed of a thermally conductive material and is provided with a plurality of spaced symmetrically disposed circumferential recesses each of which is adapted to receive one of said strip type heaters in heat exchange relation thereto.

7. A temperature control for maintaining a controlled temperature on thermoplastic materials and including a heat conducting tube for holding the thermoplastic material, a heater for heating said tube and the thermoplastic material therein, a cooler surrounding said tube and said heater and including a chamber, means for circulating a fluid coolant through said chamber in heat exchange relation to said heater, and a control responsive to the temperature of said thermoplastic material for regulating the rate of flow of the fluid coolant circulating through said chamber.

8. A heating control device for a plastic fabricating machine comprising a thermally conductive heating tube for the plastic material to be fabricated, heating means for heating said tube, cooling means for cooling said tube including a chamber surrounding said tube and said heating means, a supply line having an inlet opening into said chamber and connected with a source of fluid coolant and a discharge outlet spaced from said supply inlet for discharging the fluid coolant after circulation through said chamber, regulating means for regulating the operation of said heating means, additional means for controlling the flow of fluid through said chamber, and control means for coordinating the operation of said regulating means and said additional means whereby the temperature of the plastic material being fabricated may be held within prescribed close temperature limits.

STEPHEN DUNCAN BRADLEY.

REFERENCES CITED

The following references are of record in the file of this patent:

UNITED STATES PATENTS

| Number | Name | Date |
| --- | --- | --- |
| 1,474,524 | Garrigan | Nov. 20, 1923 |
| 1,674,852 | Clarke | June 26, 1928 |
| 1,824,585 | Wolcott et al. | Sept. 22, 1931 |
| 2,309,496 | Bird et al. | Jan. 26, 1943 |
| 2,309,943 | Ernst | Feb. 2, 1943 |